(12) United States Patent
Kamiyama

(10) Patent No.: US 8,508,720 B2
(45) Date of Patent: Aug. 13, 2013

(54) DISTANCE MEASURING SYSTEM AND DISTANCE MEASURING METHOD

(75) Inventor: Tomoyuki Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 346 days.

(21) Appl. No.: 13/123,789

(22) PCT Filed: Oct. 2, 2009

(86) PCT No.: PCT/JP2009/067231
§ 371 (c)(1),
(2), (4) Date: Apr. 12, 2011

(87) PCT Pub. No.: WO2010/047215
PCT Pub. Date: Apr. 29, 2010

(65) Prior Publication Data
US 2011/0194099 A1 Aug. 11, 2011

(30) Foreign Application Priority Data

Oct. 20, 2008 (JP) .................................. 2008-270200

(51) Int. Cl.
*G01C 3/08* (2006.01)

(52) U.S. Cl.
USPC .......................... 356/5.03; 356/4.01; 356/5.01

(58) Field of Classification Search
USPC ....................... 356/4.01, 5.01, 5.03
See application file for complete search history.

(56) References Cited

U.S. PATENT DOCUMENTS

| | | | |
|---|---|---|---|
| 5,754,280 A | 5/1998 | Kato et al. | |
| 6,683,676 B1 | 1/2004 | Seo | |
| 6,891,658 B2 * | 5/2005 | Whitehead et al. | 359/296 |
| 7,009,690 B2 | 3/2006 | Kamon et al. | |

(Continued)

FOREIGN PATENT DOCUMENTS

| | | |
|---|---|---|
| JP | 06-235609 | 8/1994 |
| JP | 2001-157227 | 6/2001 |

(Continued)

OTHER PUBLICATIONS

Ryohei Miyagawa et al., "CCD-Based Range-Finding Sensor", IEEE Transactions on Electron Devices, vol. 44, No. 10, Oct. 1997, pp. 1648-1652.

(Continued)

*Primary Examiner* — Isam Alsomiri
*Assistant Examiner* — Samantha K Abraham
(74) *Attorney, Agent, or Firm* — Squire Sanders (US) LLP

(57) ABSTRACT

A distance measuring system and a distance measuring method which use a time-of-flight (TOF) method. The distance measuring system obtains a reference light quantity of reflected light which is a cumulative light quantity of the reflected light during a reference period, obtains a measured light quantity of the reflected light which is a cumulative light quantity of the reflected light during a measurement period, and calculates, on the basis of a ratio of the measured light quantity of the reflected light to the reference light quantity of the reflected light and a ratio of the reflected light incident period to the reference period, a reflected light incident period that is a period which is included in the measurement period and during which the reflected light is incident upon photoelectric conversion elements of a light-receiving device. Then, the distance measuring system calculates the distance between the distance measuring system and an object on the basis of the reflected light incident period.

16 Claims, 9 Drawing Sheets

(56) References Cited

U.S. PATENT DOCUMENTS

| | | | |
|---|---|---|---|
| 7,623,221 B2 * | 11/2009 | Thun et al. | 356/5.06 |
| 7,791,713 B2 * | 9/2010 | Hipp | 356/5.01 |
| 7,944,548 B2 * | 5/2011 | Eaton | 356/5.01 |
| 2004/0257555 A1 * | 12/2004 | Takaoka et al. | 356/3.01 |
| 2007/0146682 A1 | 6/2007 | Tachino et al. | |
| 2011/0058153 A1 * | 3/2011 | Van Nieuwenhove et al. | 356/5.01 |

FOREIGN PATENT DOCUMENTS

| | | |
|---|---|---|
| JP | 2001-281336 | 10/2001 |
| JP | 2001-337166 A | 12/2001 |
| JP | 2005-148078 | 6/2005 |
| JP | 2007-095849 | 4/2007 |
| JP | 2007-170856 | 7/2007 |
| JP | 2007-248227 | 9/2007 |

OTHER PUBLICATIONS

Japanese Office Action application No. 2008-270200 dated Feb. 14, 2012.

* cited by examiner

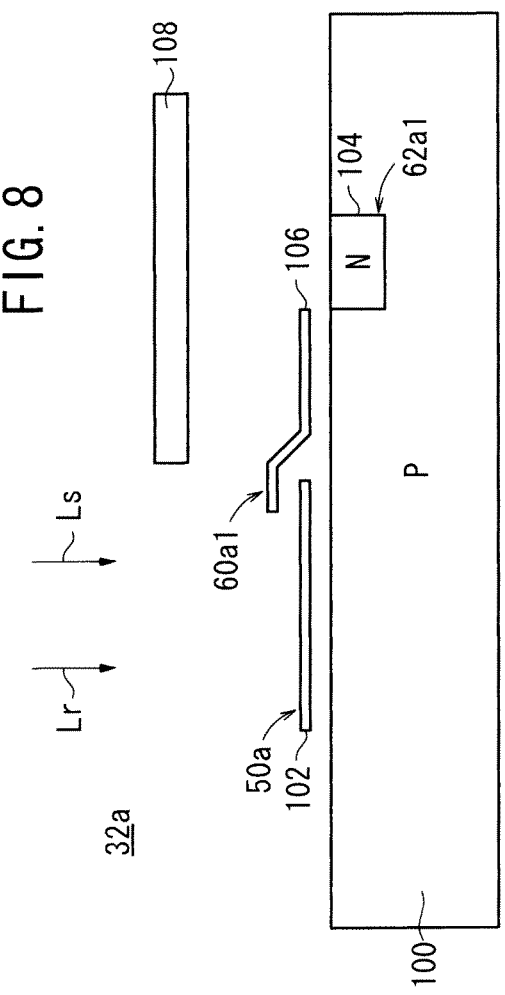

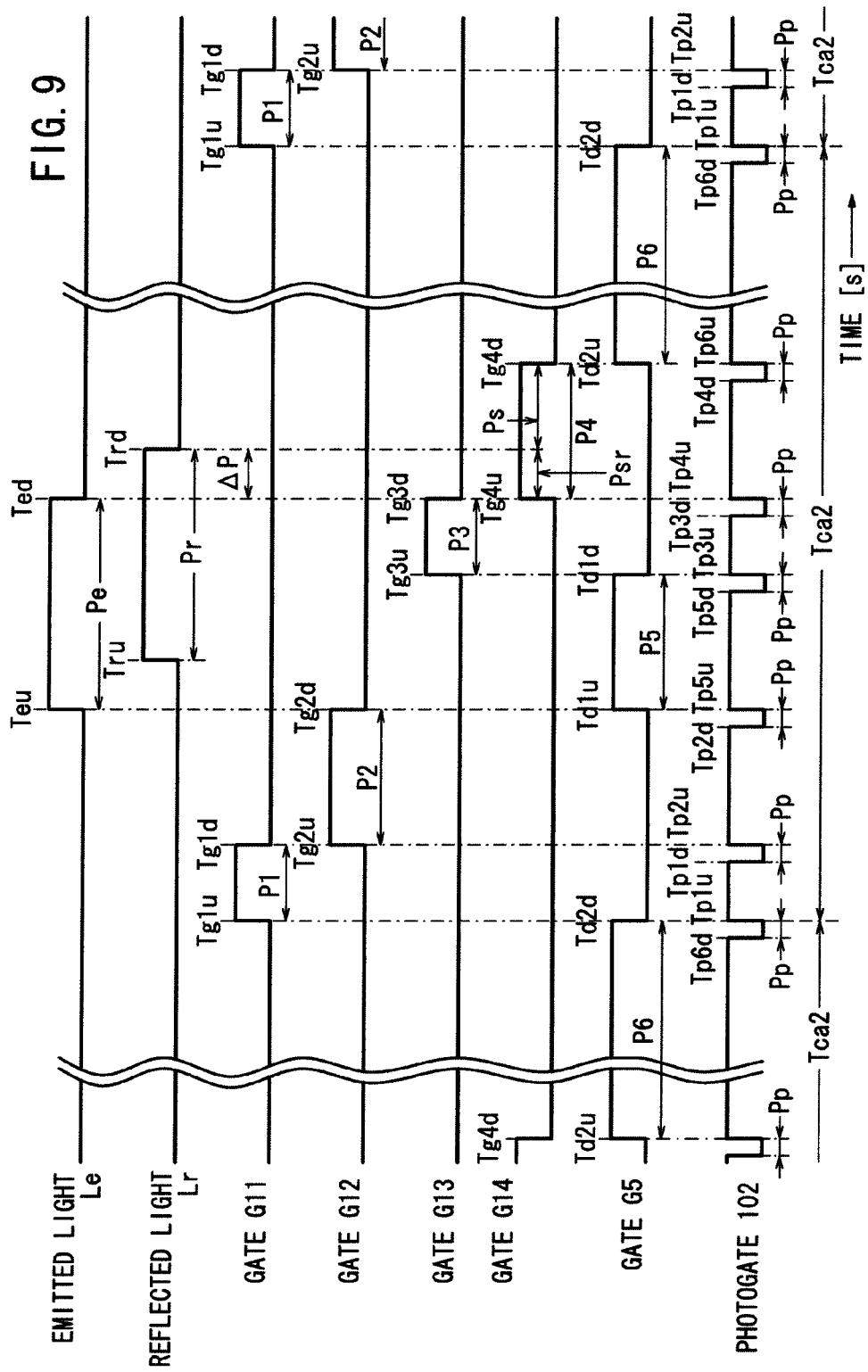

DISTANCE MEASURING SYSTEM AND DISTANCE MEASURING METHOD

TECHNICAL FIELD

The present invention relates to a rangefinding (distance measuring) system and to a rangefinding (distance measuring) method, which employ a time-of-flight (TOF) process.

BACKGROUND ART

One known rangefinding system for measuring a distance up to an object in a contactless manner employs a time-of-flight (TOF) process. According to such a TOF process, light that is emitted toward an object, and a period of time consumed after the light is emitted toward the object and until the light bounces off the object and returns, are measured, whereby the distance up to the object can be measured based on the period of time and the velocity of light (see Japanese Laid-Open Patent Publication No. 2001-281336, U.S. Pat. No. 5,754,280, and Ryohei Miyagawa and Takeo Kanade "CCD-Based Range-Finding Sensor," IEEE Transactions on Electron Devices, Vol. 44, No. 10, October 1997, pp. 1648-1652 (hereinafter referred to as the "Miyagawa paper").

The Miyagawa paper contains a detailed explanation concerning the timing at which pulsed light is emitted, as well as the timing of operations of a photosensitive device in a rangefinding system. More specifically, pulsed light is emitted and emission of the pulsed light is stopped repeatedly for identical periods (by a light-emitting device, which is energized at a duty ratio of 50%). The photosensitive device transfers photoelectrons alternately in two directions in synchronism with the emitted and non-emitted pulsed light (see FIG. 1 of the Miyagawa paper). A period of time consumed until the pulsed light bounces off the object and then returns is determined based on a difference between two output voltages of the photosensitive device.

SUMMARY OF INVENTION

The rangefinding system described in the Miyagawa paper still requires improvement as to the accuracy of measurement thereof. For example, the photosensitive device of the rangefinding system detects ambient light such as sunlight, etc., in addition to reflected light from the object. However, the rangefinding system does not perform processing in view of the effects of ambient light. When the photosensitive device detects ambient light as well as reflected light, photoelectrons output from the photosensitive device are representative both of reflected light and ambient light. Therefore, photoelectrons, which are representative of reflected light, tend to be relatively small, resulting in a reduction in the signal-to-noise ratio (S/N ratio). Furthermore, the intensity of light is proportional to the square of the distance. According to the rangefinding system of the Miyagawa paper, if the measuring range (the range of measurable distances) is to be increased, then it is necessary to increase the detecting sensitivity (dynamic range) of the photosensitive device depending on the square of the distance.

The present invention has been made in view of the aforementioned problems. It is an object of the present invention to provide a rangefinding system and a rangefinding method, which are capable of measuring distances with increased accuracy.

A rangefinding system according to the present invention comprises a light-emitting device for emitting pulsed light toward an object, a light-detecting device for detecting reflected light from the pulsed light and producing an output signal depending on the energy of reflected light that is detected, a control device for controlling the light-emitting device and the light-detecting device, and an arithmetic device for calculating a distance up to the object according to a time-of-flight process using the output signal from the light-detecting device. The light-detecting device further comprises a photodetector for detecting the reflected light and generating photoelectrons by the detected reflected light, first through fourth capacitors for storing the photoelectrons from the photodetector, a photoelectron discharger for discharging the photoelectrons from the photodetector, first through fourth gate electrodes disposed between the photodetector and the first through fourth capacitors, for allotting the photoelectrons with respect to the first through fourth capacitors in synchronism with emission of the pulsed light, and a fifth gate electrode disposed between the photodetector and the photoelectron discharger, for controlling the supply of photoelectrons from the photodetector and the photoelectron discharger. If it is assumed that a time at which the pulsed light starts to be emitted is referred to as time Teu, a time at which the pulsed light stops being emitted is referred to as time Ted, a time at which the reflected light stops being exposed to the photodetector is referred to as time Trd, respective times at which the first through fourth gate electrodes are opened are referred to as times $Tg1u$, $Tg2u$, $Tg3u$, and $Tg4u$, respective times at which the first through fourth gate electrodes are closed are referred to as times $Tg1d$, $Tg2d$, $Tg3d$, and $Tg4d$, a period from time $Tg1u$ to time $Tg1d$ is referred to as period P1, a period from time $Tg2u$ to time $Tg2d$ is referred to as period P2, a period from time $Tg3u$ to time $Tg3d$ is referred to as period P3, a period from time $Tg4u$ to time $Tg4d$ is referred to as period P4, a period from time $Tg4d$ to time Trd is referred to as period Psr, a photoelectron quantity stored in the first capacitor during period P1 is referred to as photoelectron quantity Q1, a photoelectron quantity stored in the second capacitor during period P2 is referred to as photoelectron quantity Q2, a photoelectron quantity stored in the third capacitor during period P3 is referred to as photoelectron quantity Q3, a photoelectron quantity stored in the fourth capacitor during period P4 is referred to as photoelectron quantity Q4, a period during which the pulsed light is emitted, reflected by the object, and returned as reflected light is referred to as round trip time $\Delta P$, and a distance between the rangefinding system and the object is referred to as distance D, then the control device controls emission of pulsed light from the light-emitting device and opening and closing of the first through fourth gate electrodes so as to satisfy the relationships (1) P1=P3, (2) P2=P4, and (3) $Tg1u < Tg1d \leq Tg2u < Tg2d \leq Teu < Tg3u < Tg3d \leq Tg4u \leq Ted < Tg4d$, or $Teu < Tg3u < Tg3d \leq Tg4u \leq Ted < Tg4d < Tg1u < Tg1d \leq Tg2u < Tg2d$, and the control device opens the fifth gate electrode to discharge the photoelectrons when all of the first through fourth gate electrodes are closed. Further, the arithmetic device acquires light energy information of the reflected light during the period P3 based on the difference between the photoelectron quantity Q3 stored in the third capacitor corresponding to ambient light, and the reflected light and the photoelectron quantity Q1 stored in the first capacitor corresponding to the ambient light, the arithmetic device acquires light energy information of the reflected light during the period Psr based on the difference between the photoelectron quantity Q4 stored in the fourth capacitor corresponding to the ambient light and the reflected light, and the photoelectron quantity Q2 stored in the second capacitor corresponding to the ambient light, the arithmetic device calculates the round trip time ΔP based on a ratio of the light energy information of the reflected light during the period P3 and the light energy information of the reflected light during the period Psr, and a ratio of the period P3 and the period Psr, and the arithmetic device measures the distance D based on the round trip time ΔP.

According to the present invention, the rangefinding system has an increased dynamic range and is capable of reducing or eliminating the effect of ambient light. As a consequence, the rangefinding system increases measurement accuracy.

According to the present invention, more specifically, the rangefinding system determines the photoelectron quantity Q1 stored during the period P1, in which only ambient light is exposed to the photodetector, and the photoelectron quantity Q3 stored during the period P3, during which both ambient light and reflected light are exposed to the photodetector. Since the period P1 and the period P3 are set to the same length, the rangefinding system can determine the photoelectron quantity corresponding to the reflected light during the period P3 (corresponding to light energy [J] of the reflected light in the period P3) from the difference between the photoelectron quantity Q3 and the photoelectron quantity Q1 (Q3−Q1).

The rangefinding system also determines the photoelectron quantity Q2 stored during the period P2, in which only ambient light Ls is exposed to the photodetector, and the photoelectron quantity Q4 stored during the period P4. The period P4 comprises a period (period Psr), during which both ambient light and reflected light are exposed to the photodetector, and a period (period Ps) during which only ambient light is exposed to the photodetector. Since the period P2 and the period P4 are set to the same length, the rangefinding system can determine the photoelectron quantity corresponding to the period Psr that occurs within the period P4 (corresponding to the energy of reflected light in the period Psr) from the difference between the photoelectron quantity Q4 and the photoelectron quantity Q2 (Q4−Q2).

If the intensity of reflected light (light energy per unit time [W]) is constant while the reflected light is being exposed to the photodetector, then a ratio of the difference between the photoelectron quantity Q4 and the photoelectron quantity Q2 to the difference between the photoelectron quantity Q3 and the photoelectron quantity Q1 (Q4−Q2:Q3−Q1) becomes equal to a ratio of the period Psr to the period P3 (Psr:P3). Therefore, the period Psr can be determined by the following equation:

$$Psr=\{(Q4-Q2)/(Q3-Q1)\}\times P3$$

When time Ted and time Tg4$u$ are equal to each other, the period Psr becomes equal to the round trip time ΔP. When time Ted is subsequent to time Tg4$u$, the period Psr becomes equal to the difference between the round trip time ΔP and the period from time Ted to time Tg4$u$ {ΔP−(Ted−Tg4$u$)}. Since time Ted and time Tg4$u$ can be set to predetermined values, the round trip time ΔP can also be determined in this case. Consequently, the round trip time ΔP can be determined in either case, and hence the distance D can be determined based on the round trip time ΔP and the velocity of light (about 300,000 kilometers per second).

Since the rangefinding system removes the photoelectron quantity generated due to ambient light, the rangefinding system is capable of eliminating or reducing the effect of ambient light.

As the distance D becomes smaller, the period during which reflected light is exposed (round trip time ΔP) is made shorter, whereas, as the distance D becomes greater, the period during which reflected light is exposed is made longer. Generally, assuming the same object is involved, as the distance D becomes smaller, the intensity [W] of light reflected from the object becomes greater, whereas, as the distance D becomes greater, the intensity of light reflected from the object becomes smaller. Consequently, if the distance D is comparatively small, then reflected light of a greater intensity is exposed over a shorter period. On the other hand, if the distance D is comparatively great, then reflected light of a smaller intensity is exposed over a longer period. As a result, a change in the cumulative energy of reflected light, which is exposed during the period Psr, is small compared with the change in distance D. This implies that it is possible to narrow the dynamic range of the light-detecting device, and therefore, the dynamic range of the rangefinding system can be increased.

The control device may control the light-emitting device so as to emit pulsed light a plurality of times during each measuring cycle, and the arithmetic device may calculate the round trip time ΔP using the photoelectron quantities Q1 through Q4, after the photoelectrons have been stored a plurality of times in each of the first through fourth capacitors. Generally, the intensity of ambient light (e.g., sunlight) varies at all times. By emitting pulsed light a plurality of times during each measuring cycle, and calculating the round trip time ΔP using the photoelectron quantities Q1 through Q4, which are stored as many times as the number of times that the pulsed light is emitted, the intensity of the ambient light can be averaged. As a consequence, the accuracy at which the photoelectron quantity generated by ambient light is removed can be increased, thereby increasing measurement accuracy.

The light-emitting device may set a period during which pulsed light is emitted to at most 1 percent of each measuring cycle, while the light-detecting device may set a period during which the first through fourth gate electrodes are opened to at most 1 percent of each measuring cycle. As a result, the possibility of interference with another rangefinding system (i.e., such that pulsed light from another rangefinding system is falsely recognized as pulsed light from the actual rangefinding system) is low. In addition, the effect that ambient light has as a noise component is reduced, thus resulting in an increased signal-to-noise ratio (S/N). Furthermore, it is possible to prevent aliasing (i.e., a phenomenon in which pulsed light emitted in a previous measuring cycle is detected in a current measuring cycle) from occurring.

The light-detecting device may further comprise first through fourth amplifiers having respective gates connected respectively to the first through fourth capacitors, for outputting voltages depending on potentials across the first through fourth capacitors.

The light-detecting device may further comprise a power supply and sixth gate electrodes for resetting potentials across the first through fourth capacitors.

The photodetector may comprise one of a photodiode, a pinned photodiode, and a photogate. Each of the first through fourth capacitors may comprise one of an MIM capacitor, a MOS capacitor, a pinned photodiode, and a PN junction.

The light-detecting device may further comprise a light shield for blocking light from entering into the first through fourth gate electrodes and the first through fourth capacitors.

The light-emitting device may include a light emitter comprising one of a light-emitting diode, a laser diode, and a semiconductor laser bar. The light-emitting device may include a light emitter comprising an array of semiconductor laser bars.

The light-detecting device may include one of a line sensor and an image sensor having a plurality of pixels each comprising the photodetector, the first through fourth capacitors, the photoelectron discharger, and the first through fifth gate electrodes.

According to the present invention, there is also provided a rangefinding method carried out by a rangefinding system including a light-emitting device for emitting pulsed light toward an object, a light-detecting device for detecting reflected light from the pulsed light and producing an output signal depending on the energy of reflected light that is detected, a control device for controlling the light-emitting device and the light-detecting device, and an arithmetic device for calculating a distance up to the object according to a time-of-flight process using the output signal from the light-detecting device. The rangefinding method comprises the steps of determining reflected light reference energy, which represents cumulative light energy of the reflected light during a reference period, determining measured reflected light energy, which represents cumulative light energy of the reflected light during a measuring cycle, calculating a reflected light incident period, which represents a period during which the reflected light is exposed to a photodetector of the light-detecting device within the measuring cycle, based on a ratio of the measured reflected light energy and the reflected light reference energy, and a ratio of the reflected light incident period and the reference period, and calculating a distance between the rangefinding system and the object based on the reflected light incident period.

According to the present invention, the dynamic range of the rangefinding system is increased together with increasing measurement accuracy. More specifically, according to the present invention, a reflected light incident period, which represents a period during which reflected light is exposed to a photodetector of the light-detecting device within the measuring cycle, is calculated based on a ratio of the measured reflected light energy and the reflected light reference energy, and a ratio of the reflected light incident period and the reference period. As the distance between the rangefinding system and the object become smaller, the reflected light incident period is made shorter, whereas, as the distance becomes greater, the reflected light incident period is made longer. Generally, assuming the same object is involved, as the distance becomes smaller, the intensity of light reflected from the object becomes greater, whereas, as the distance becomes greater, the intensity light reflected by the object becomes smaller. Consequently, if the distance is comparatively small, then reflected light of a greater intensity is exposed over a shorter period. On the other hand, if the distance is comparatively great, then reflected light of a smaller intensity is exposed over a longer period. As a result, a change in the cumulative energy of reflected light, which is exposed during the reflected light incident period, is small compared with the change in distance. This implies that it is possible to narrow the dynamic range of the light-detecting device, and therefore, the dynamic range of the rangefinding system can be increased.

The step of determining the reflected light reference energy may further comprise the steps of determining ambient light reference energy, which represents cumulative light energy of ambient light during a first reference period, determining combined light reference energy, which represents cumulative combined light energy of the ambient light and the reflected light during a second reference period, which has the same length as the first reference period, and calculating the reflected light reference energy during the second reference period by subtracting the ambient light reference energy from the combined light reference energy. The step of determining the measured reflected light energy may further comprise the steps of determining measured ambient light energy, which represents cumulative light energy of the ambient light during a first measuring cycle, determining measured combined light energy, which represents cumulative combined light energy of the ambient light and the reflected light during a second measuring cycle, which has the same length as the first measuring cycle, and calculating the measured reflected light energy during the second reference period by subtracting the measured ambient light energy from the measured combined light energy. Since the cumulative energy of ambient light is removed, the effect of such ambient light can be reduced or eliminated.

The rangefinding method may further comprise the steps of setting a plurality of first reference periods, a plurality of second reference periods, a plurality of first measuring cycles, and a plurality of second measuring cycles in each measuring cycle, determining the ambient light reference energy as a sum of cumulative light energy of the ambient light respectively during the first reference periods, determining the combined light reference energy as a sum of cumulative combined light energy respectively during the second reference periods, determining the measured ambient light energy as a sum of cumulative light energy of the ambient light respectively during the first measuring cycles, and determining the measured combined light energy as a sum of cumulative combined light energy respectively during the second measuring cycles. Generally, the intensity of ambient light (e.g., sunlight) as a noise component varies at all times. The intensity of ambient light can be averaged by setting a plurality of first reference periods, a plurality of second reference periods, a plurality of first measuring cycles, and a plurality of second measuring cycles during each measuring cycle, determining the ambient light reference energy as a sum of cumulative light energy of the ambient light respectively during the first reference periods, determining the combined light reference energy as a sum of cumulative combined light energy respectively during the second reference periods, determining the measured ambient light energy as a sum of cumulative light energy of the ambient light respectively during the first measuring cycles, and determining the measured combined light energy as a sum of cumulative combined light energy respectively during the second measuring cycles. As a consequence, the accuracy at which photoelectron quantities generated by ambient light are removed can be increased, thereby increasing measurement accuracy.

Each of a period during which pulsed light is emitted, the reference period, and the measuring period may be set to at most 1 percent of each measuring cycle. As a result, the possibility of interference with another rangefinding system (i.e., such that pulsed light from another rangefinding system is falsely recognized as pulsed light from the actual rangefinding system) is low. In addition, the effect that ambient light has as a noise component is reduced, thus resulting in an increased signal-to-noise ratio (S/N). Furthermore, it is possible to prevent aliasing (i.e., a phenomenon in which pulsed light emitted in a previous measuring cycle is detected in a current measuring cycle) from occurring.

According to the present invention, the dynamic range of the rangefinding system is increased, while the effect of ambient light is reduced or eliminated. As a result, the measurement accuracy of the rangefinding system can be increased.

BRIEF DESCRIPTION OF DRAWINGS

FIG. 8 is a partial vertical cross-sectional view of a modified pixel; and

FIG. 9 is a timing chart of emitted light, reflected light, a plurality of gates, and a photogate of the pixel shown in FIG. 8.

DESCRIPTION OF EMBODIMENTS

A. Embodiment

A rangefinding system according to an embodiment of the present invention will be described below with reference to the drawings.

1. Arrangement of the Rangefinding System 10

Figure 1:
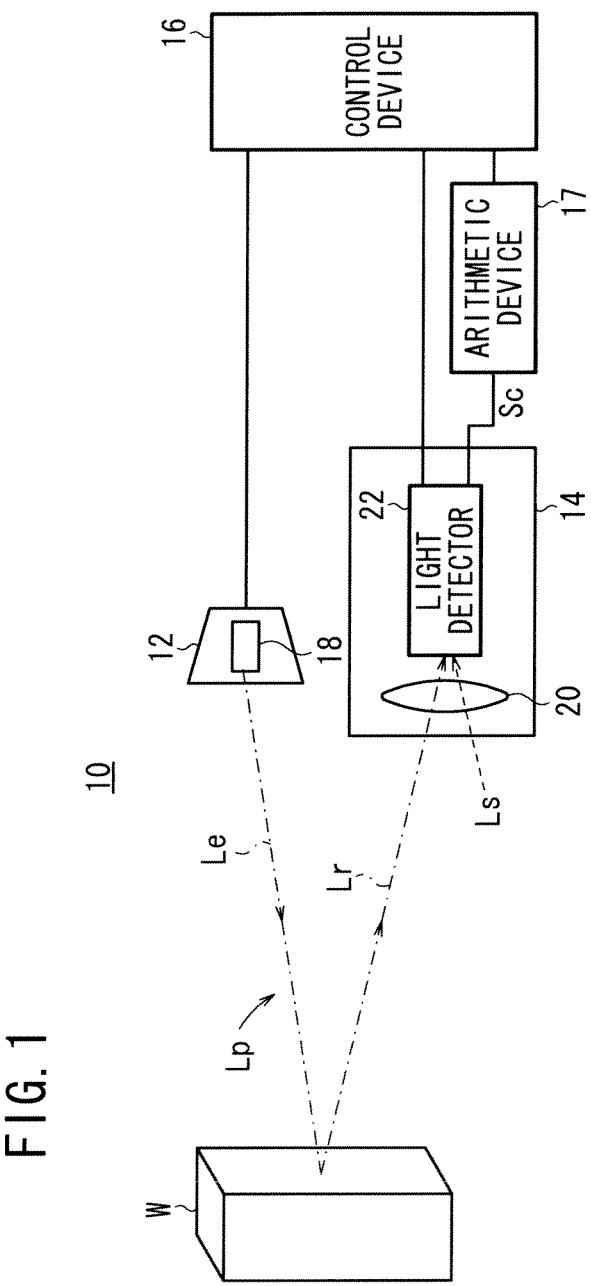
FIG. 1 is a block diagram of a rangefinding system according to an embodiment of the present invention.

(1) Overall Arrangement of the Rangefinding System 10:

FIG. 1 is a block diagram of a rangefinding system 10 according to an embodiment of the present invention. The rangefinding system 10 serves to acquire a three-dimensional image using distances that are measured based on output signals from pixels 32 of an image sensor 30, to be described later. The rangefinding system 10 includes a light-emitting device 12, a light-detecting device 14, a control device 16, and an arithmetic device 17. The rangefinding system 10 operates such that, in response to a command from the control device 16, a light emitter 18 of the light-emitting device 12 emits pulsed light Lp, and the pulsed light Lp is reflected by an object W and exposed to the light-detecting device 14. Based on a command from the control device 16, the light-detecting device 14 outputs a signal representative of photoelectrons depending on the amount of detected light (stored photoelectron signal Sc) to the arithmetic device 17. The arithmetic device 17 calculates a period (round trip time ΔP) [s] that the pulsed light Lp has taken in order to travel from the light-emitting device 12 to the light-detecting device 14, and then calculates a distance D [m] between the rangefinding system 10 and the object W based on the round trip time ΔP. The calculated result from the arithmetic device 17 is output to a display device, not shown, for example. For illustrative purposes, the pulsed light Lp that travels from the light-emitting device 12 to the object W will be referred to as "emitted light Le," whereas the pulsed light Lp that travels from the object W to the light-detecting device 14 will be referred to as "reflected light Lr".

(2) Light-Emitting Device 12:

The light-emitting device 12 comprises the light emitter 18, which outputs pulsed light Lp based on a command from the control device 16. According to the present embodiment, the light emitter 18 of the light-emitting device 12 comprises a stack of (series-connected) surface emission semiconductor laser bars, each having a linear array of light-emitting spots (emitters).

According to the present embodiment, the light emitter 18 is capable of emitting 100 watts (W) of infrared radiation at a wavelength of 870 nanometers. Further, according to the present embodiment, a plurality of exposure processes (photoelectron storing processes) are performed during each measuring cycle Cm (i.e., a cycle during which a measured value is determined) (see FIG. 5). Whereas an exposure process has a cycle (exposing cycle or photoelectron storage cycle Tca2) of 100 microseconds (μs), the light emitter 18 outputs pulsed light Lp for an output time (pulse duration) of 100 nanoseconds (ns). Stated otherwise, the light emitter 18 has a duty ratio of 0.1 percent (%).

The light emitter 18 may comprise a linear array of light-emitting spots or a matrix of light-emitting spots. The light emitter 18 may employ light-emitting elements such as laser diodes, light-emitting diodes (LEDs), or other types of light-emitting elements. Pulsed light Lp emitted by the light emitter 18 may have other wavelengths in a range from 700 nm to 1050 nm, for example. The light emitter 18 may emit other output levels in a range from 20 W to 10 kW. The pulsed light Lp may have other pulse durations in a range from 10 nanoseconds to 1 millisecond. In addition, the light emitter 18 may have other duty ratios in a range from 0.01% to 1%.

(3) Light-Detecting Device 14:

(a) Overall Arrangement of the Light-Detecting Device 14:

As shown in FIG. 1, the light-detecting device 14 comprises a lens 20 and a light detector 22. Reflected light Lr and ambient light Ls that have passed through the lens 20 are focused onto the light detector 22. The lens 20 may comprise a linear array of lenses or a matrix of lenses.

Figure 2:
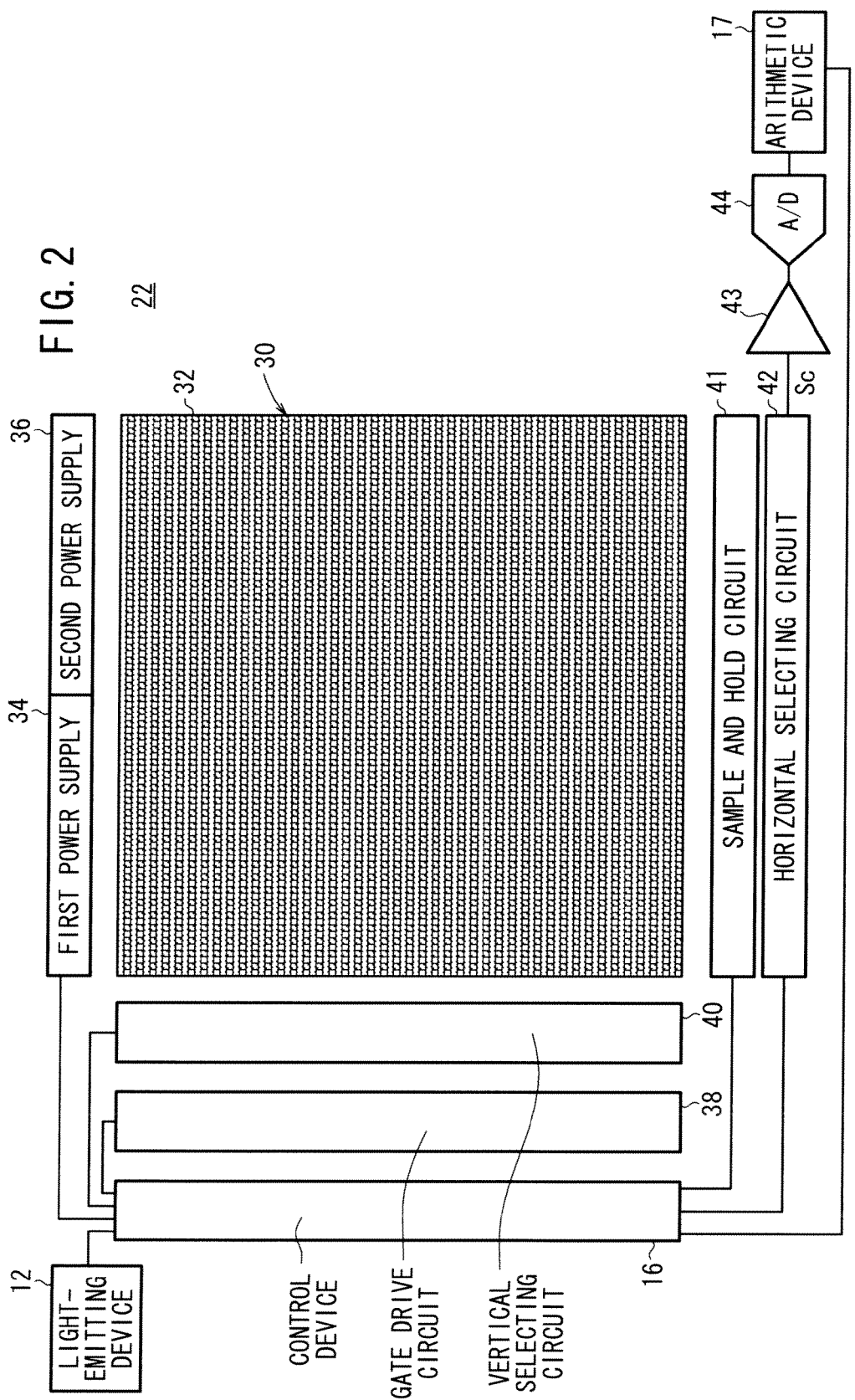
FIG. 2 is a block diagram of a photodetector according to the embodiment.

As shown in FIG. 2, the light detector 22 comprises an image sensor 30 made up from a matrix of pixels 32, a first power supply 34, a second power supply 36, a gate drive circuit 38, a vertical selecting circuit 40, a sample and hold circuit 41, a horizontal selecting circuit 42, an output buffer 43, and an A/D converter 44.

The image sensor 30 outputs a stored photoelectron signal Sc depending on the amount of light detected by each of the pixels 32. The first power supply 34 applies a positive power supply voltage VDD [V] (see FIG. 3) to the image sensor 30, and the second power supply 36 applies a positive reference voltage Vref [V] to the image sensor 30. The gate drive circuit 38 outputs a gate drive signal Sdg (see FIG. 3), which collectively refers to gate drive signals Sdg1 through Sdg4, resetting signals Sreset1 through Sreset4, and a photoelectron discharge signal Sde, to thereby selectively drive the gates of first switching elements 60a through 60d, third switching elements 68a through 68d, and a fourth switching element 70 of the image sensor 30. The vertical selecting circuit 40 includes a multiplexer (not shown), which selectively outputs read signals Sread1 through Sread4 (see FIG. 3) to a row in which a pixel 32 to be read belongs, so as to enable the pixel 32 to output a stored photoelectron signal Sc. The horizontal selecting circuit 42 includes another multiplexer (not shown), which selects a column in which the pixel 32 to be read belongs. The stored photoelectron signal Sc read from the pixel 32 is converted by respective constant-current circuits 58a, 58b into output voltages Vout1, Vout2 (see FIG. 3). Thereafter, the stored photoelectron signal Sc is held by the sample and hold circuit 41, and then the stored photoelectron signal Sc is output from the horizontal selecting circuit 42. The stored photoelectron signal Sc, having been output from the horizontal selecting circuit 42, is sent via the output buffer 43 and the A/D converter 44 to the arithmetic device 17. When the arithmetic device 17 receives the stored photoelectron signal Sc, the arithmetic device 17 determines an amount Ar of reflected light Lr from the stored photoelectron signal Sc, and then, as described in detail below, the arithmetic device 17 calculates a distance D between the rangefinding system 10 and the object W.

Figure 3:
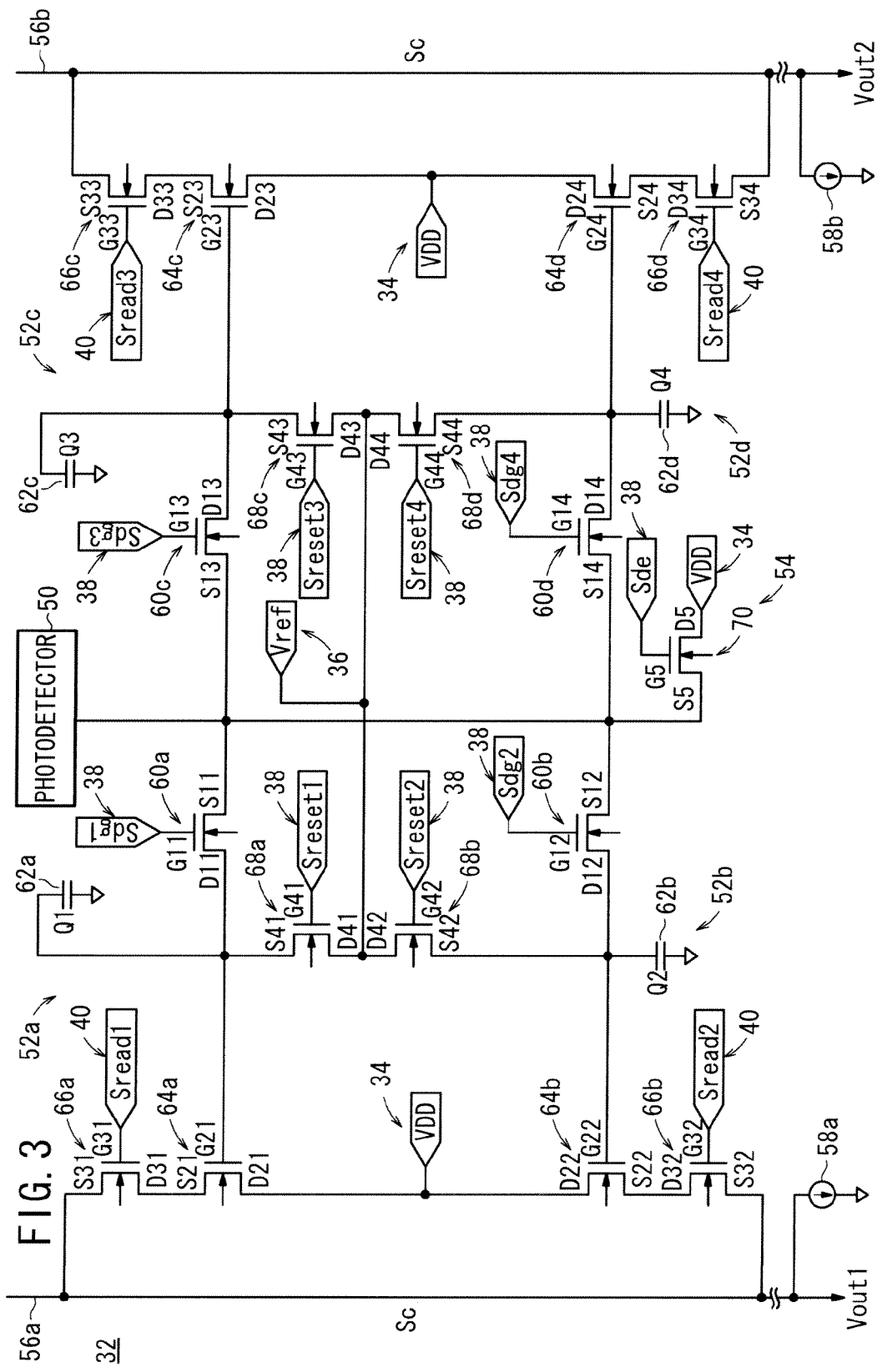
FIG. 3 is a circuit diagram of a pixel in an image sensor of the photodetector.

(b) Pixel 32:

FIG. 3 is a circuit diagram of one pixel 32 in the image sensor 30. As shown in FIG. 3, the pixel 32 includes a photodetector 50, first through fourth photoelectron storage units 52a through 52d, a photoelectron discharger 54, and output lines 56a, 56b. The constant-current circuits 58a, 58b are associated respectively with each column of the pixel 32.

(i) Photodetector 50:

According to the present embodiment, the photodetector 50 comprises a pinned photodiode, which generates photoelectrons depending on the amount Ar of reflected light Lr. Alternatively, the photodetector 50 may comprise another type of photodetector, such as a photodiode, a photogate, or the like, rather than the pinned photodiode. (ii) First through Fourth Photoelectron Storage Units 52a through 52d:

The first photoelectron storage unit 52a comprises a first switching element 60a, a capacitor 62a, an amplifier 64a, a second switching element 66a, and a third switching element 68a. Similarly, the second through fourth photoelectron storage units 52b through 52d comprise, respectively, first switching elements 60b through 60d, capacitors 62b through 62d, amplifiers 64b through 64d, second switching elements 66b through 66d, and third switching elements 68b through 68d. In the present embodiment, each of the first switching elements 60a through 60d, the amplifiers 64a through 64d, the second switching elements 66a through 66d, and the third switching elements 68a through 68d are constituted by NMOS transistors.

The first switching elements 60a through 60d select which of the first through fourth photoelectron storage units 52a through 52d the photoelectrons generated by the photodetector 50 are supplied to. More specifically, the first switching elements 60a through 60d have respective sources S11 through S14, which are connected respectively to the photodetector 50, respective drains D11 through D14, which are connected respectively to the first through fourth capacitors 62a through 62d, and respective gates G11 through G14, which are connected to the gate drive circuit 38. In response to the gate drive signals Sdg1 through Sdg4, which are supplied from the gate drive circuit 38 to the gates G11 through G14, the first switching elements 60a through 60d are selectively turned on and off, so as to allocate the photoelectrons generated by the photodetector 50 to any one of the first through fourth photoelectron storage units 52a through 52d. For example, when the first switching element 60a is turned on, photoelectrons generated by the photodetector 50 are supplied to the first photoelectron storage unit 52a. As described later, in the event that all the first switching elements 60a through 60d are turned off, the photoelectrons generated by the photodetector 50 are discharged from the photoelectron discharger 54.

When the first switching element 60a is turned on, the capacitor 62a stores the photoelectrons generated by the photodetector 50. Similarly, when the second through fourth switching elements 60b through 60d are turned on, the capacitors 62b through 62d store the photoelectrons generated by the photodetector 50.

When the gate G31 of the second switching element 66a is turned on, the amplifier 64a outputs to the output line 56a a stored photoelectron signal Sc depending on the quantity of photoelectrons (photoelectron quantity Q1) [C] stored in the capacitor 62a. The amplifier 64a has a drain D21, which is connected to the positive power supply voltage VDD [V] of the first power supply 34, a gate G21 connected to the capacitor 62a, and a source S21, which is connected to the output line 56a through the second switching element 66a. The amplifier 64a outputs the stored photoelectron signal Sc having a voltage (voltage V1) [V] that depends on the photoelectron quantity Q1.

Similarly, when gates G32 through G34 of the second switching elements 66b through 66d are turned on, the amplifiers 64b through 64d output to the output lines 56a, 56b stored photoelectron signals Sc, which depend on quantities of photoelectrons (photoelectron quantities Q2 through Q4) [C] stored respectively in the capacitors 62b through 62d. The amplifiers 64b through 64d have respective sources S22 through S24, which are connected to a negative power supply voltage VSS [V] of the first power supply 34 through the second switching elements 66b through 66d and the output lines 56a, 56b, respective drains D22 through d24, which are connected to the positive power supply voltage VDD [V] of the first power supply 34, and respective gates G22 through G24 connected to the capacitor 62a. The amplifiers 64b through 64d output the stored photoelectron signals Sc having voltages (voltages V2 through V4) [V] that depend on the photoelectron quantities Q2 through Q4.

The second switching elements 66a through 66d selectively supply the voltages V1 through V4 from the amplifiers 64a through 64d to the output lines 56a, 56b. More specifically, the second switching elements 66a through 66d comprise, respectively, sources S31 through S34 connected to the output lines 56a, 56b, drains D31 through D34 connected respectively to the sources S21 through S24 of the amplifiers 64a through 64d, and gates G31 through G34 connected to the vertical selecting circuit 40. When the vertical selecting circuit 40 selectively supplies gate drive signals (read signals Sread1 through Sread4) respectively to the gates G31 through G34, i.e., when the vertical selecting circuit 40 selectively applies high-level voltages to the gates G31 through G34, the gates G31 through G34 are selectively turned on, thereby outputting selectively the stored photoelectron signals Sc from the capacitors 62a through 62d to the output lines 56a, 56b. The stored photoelectron signals Sc supplied to the output lines 56a, 56b are then supplied to the arithmetic device 17 via the sample and hold circuit 41, the horizontal selecting circuit 42, the output buffer 43, and the A/D converter 44.

Conversely, when the vertical selecting circuit 40 does not supply the read signals Sread1 through Sread4 to the respective gates G31 through G34 (i.e., when the vertical selecting circuit 40 applies low-level voltages to the gates G31 through G34), the gates G31 through G34 are not turned on (i.e., current does not flow from the drains D21 through D24 to the sources S21 through S24 of the amplifiers 64a through 64d) and the stored photoelectron signals Sc are not output from the capacitors 62a through 62d to the output lines 56a, 56b.

The third switching elements 68a through 68d reset the photoelectron quantities Q1 through Q4 that are stored in the capacitors 62a through 62d. More specifically, the third switching elements 68a through 68d include respective sources S41 through S44, which are connected respectively to the capacitors 62a through 62d, respective drains D41 through D44, which are connected respectively to the positive reference voltage Vref [V] of the second power supply 36, and respective gates G41 through G44 connected to the gate drive circuit 38. When the gate drive circuit 38 selectively or simultaneously applies gate drive signals (resetting signals Sreset1 through Sreset4) to the respective gates G41 through G44, the third switching elements 68a through 68d are selectively or simultaneously turned on, thereby transferring photoelectrons stored in the capacitors 62a through 62d to the second power supply 36 and resetting the photoelectron quantities Q1 through Q4 stored in the capacitors 62a through 62d.

(iii) Photoelectron Discharger 54:

The photoelectron discharger 54 comprises a fourth switching element 70 for discharging photoelectrons. The fourth switching element 70 discharges photoelectrons when all of the first switching elements 60a through 60d are turned off, i.e., when the photoelectrons generated by the photodetector 50 are not allocated to the first through fourth photoelectron storage units 52a through 52d. The fourth switching element 70 includes a source S5, which is connected to the photodetector 50, a drain D5, which is connected to the positive power supply voltage VDD [V] of the first power supply 34, and a gate G5 connected to the gate drive circuit 38. When the gate drive circuit 38 applies a gate drive signal (photoelectron discharge signal Sde) to the gate G5, (i.e., when the gate drive circuit 38 applies a high-level voltage to the gate G5), the gate G5 is turned on, thereby discharging the photoelectrons generated by the photodetector 50 without allocated the photoelectrons with respect to the first through fourth photoelectron storage units 52a through 52d. Therefore, the first through fourth photoelectron storage units 52a through 52d are supplied selectively with the photoelectrons, which are generated by the photodetector 50, only during a period in which the gates G11 through G14 are turned on. As a result, the distance D between the rangefinding system 10 and the object W can be measured according to the process described hereinbelow.

Figure 4:
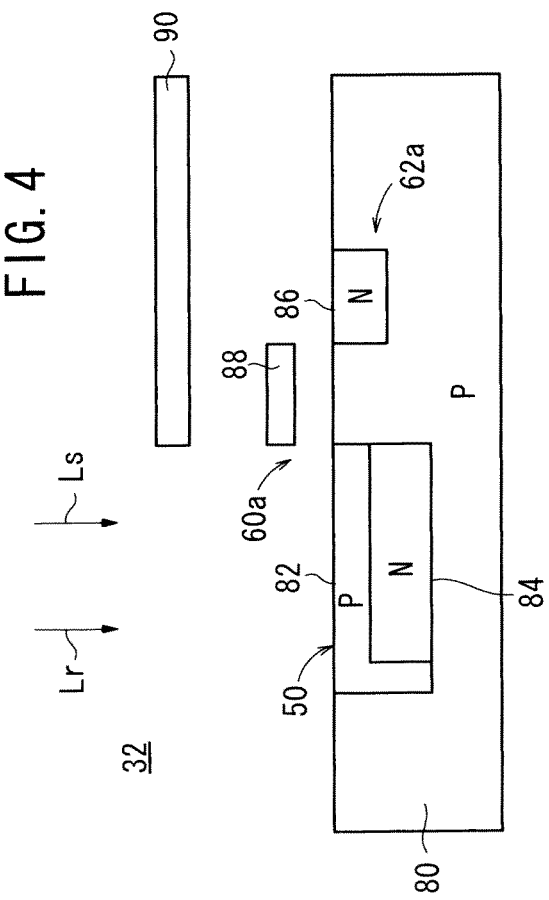
FIG. 4 is a partial vertical cross-sectional view of the pixel.

(iv) Structural Example of Pixel 32:

FIG. 4 is a partial vertical cross-sectional view of the pixel 32. As shown in FIG. 4, the pixel 32 comprises a P-type substrate 80, a P-type first semiconductor region 82, an N-type second semiconductor region 84, an N-type third semiconductor region 86, a transfer gate 88 in the form of a polysilicon layer, and a light shield 90.

The entire upper surface of the P-type first semiconductor region 82 is exposed outwardly for receiving reflected light Lr and ambient light Ls.

According to the present invention, the P-type first semiconductor region 82 and the N-type second semiconductor region 84 jointly make up the photodetector 50. As described above, the photodetector 50 comprises a pinned photodiode. The substrate 80, the second semiconductor region 84, the third semiconductor region 86, and the transfer gate 88 jointly make up the first switching element 60a. The third semiconductor region 86 also functions as a floating diffusion and constitutes the capacitor 62a.

The light shield 90 is disposed in covering relation to the upper surface of the third semiconductor region 86 and the transfer gate 88, for thereby blocking and preventing reflected light Lr and ambient light Ls from entering into the third semiconductor region 86 and the transfer gate 88.

2. Process of Measuring the Distance D Between the Rangefinding System 10 and the Object W A process for measuring the distance D between the rangefinding system 10 and the object W will be described below.

Figure 5:
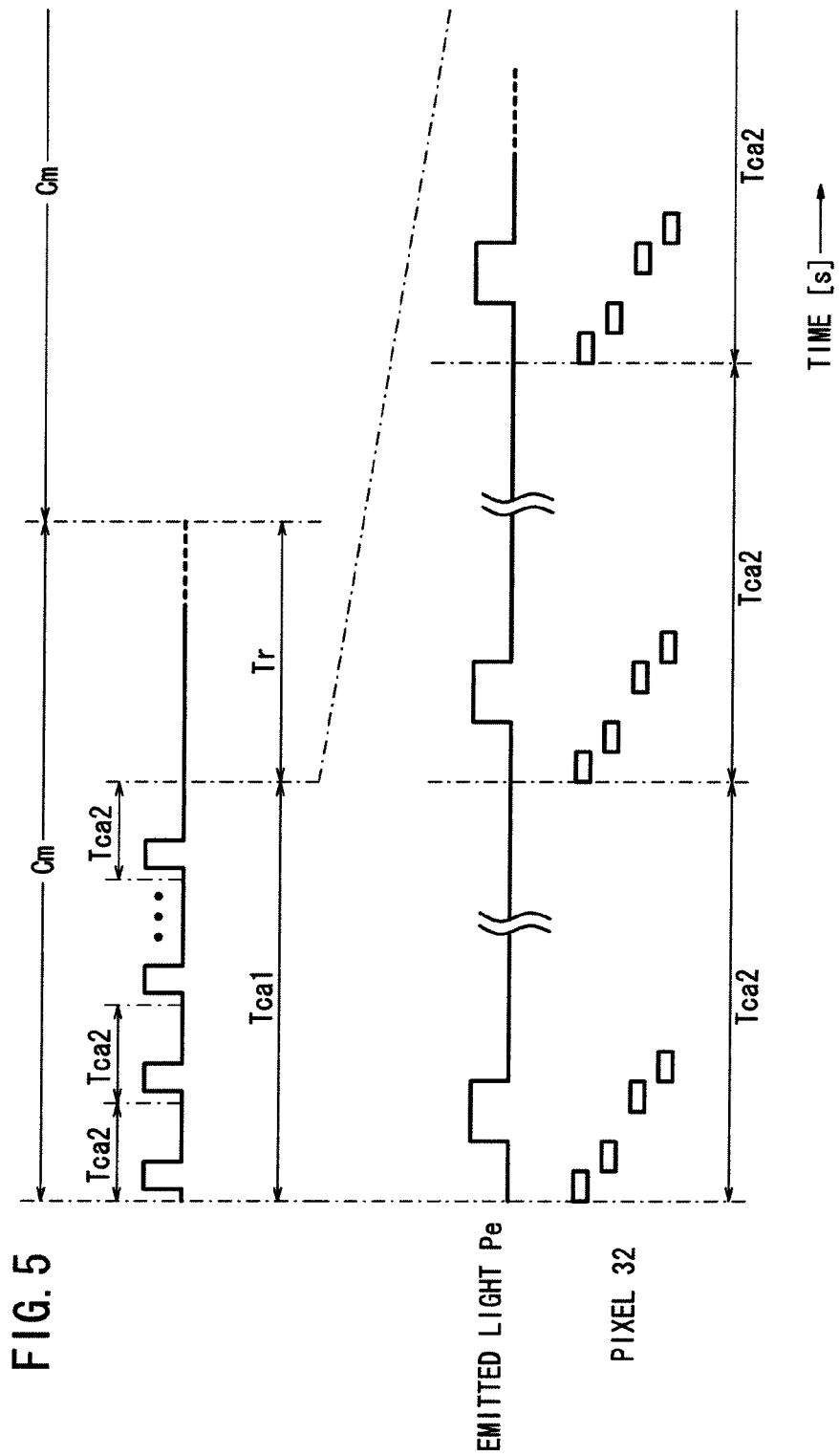
FIG. 5 is a timing chart of a measuring cycle according to the embodiment.

(1) Measuring Cycle Cm:

As shown in FIG. 5, while the rangefinding system 10 is in operation, each measuring cycle Cm (i.e., a period for determining a measured value) [count/s] comprises a cumulative photoelectron storage period Tca1 [s], during which photoelectrons are stored cumulatively in the first through fourth capacitors 62a through 62d, and a readout period Tr [s], during which the photoelectrons stored in the first through fourth capacitors 62a through 62d are read out. The cumulative photoelectron storage period Tca1 comprises a plurality of photoelectron storage periods Tca2, each of which represents a period during which a process (i.e., a photoelectron storing process) of exposing the pixel 32 to pulsed light Lp is carried out, in order to store photoelectrons in the first through fourth capacitors 62a through 62d. In the present embodiment, each of the cumulative photoelectron storage period Tca1 and the readout period Tr is 10 milliseconds, whereas each of the photoelectron storage periods Tca2 is 100 microseconds. In each of the photoelectron storage periods Tca2, pulsed light Lp is emitted for an output time (pulse duration) of 100 nanoseconds. Therefore, the light emitter 18 is energized at a duty ratio of 0.1 percent during each of the photoelectron storage periods Tca2.

Since the rangefinding system 10 is capable of outputting measured results as a three-dimensional image, each measuring cycle Cm can also be defined as a frame rate [frames/s] of such a three-dimensional image.

In the present embodiment, the rangefinding system 10 performs 100 photoelectron storing processes during the cumulative photoelectron storage period Tca1, and measures the round trip time $\Delta P$ and the distance D based on the photoelectron quantities Q1 through Q4, which as a result of the photoelectron storing processes, are stored in the capacitors 62a through 62d.

(2) Summary of the Measuring Process (One Photoelectron Storage Period Tca2):

In the present embodiment, the rangefinding system 10 measures the round trip time $\Delta P$ and the distance D based on the photoelectron quantities Q1 through Q4, which are stored in the capacitors 62a through 62d during the entire cumulative photoelectron storage period Tca1. To facilitate understanding of the present invention, however, an explanation shall be made in which the rangefinding system 10 measures the round trip time $\Delta P$ and the distance D based on the photoelectron quantities Q1 through Q4, which are stored in the capacitors 62a through 62d during one photoelectron storage period Tca2.

Figure 6:
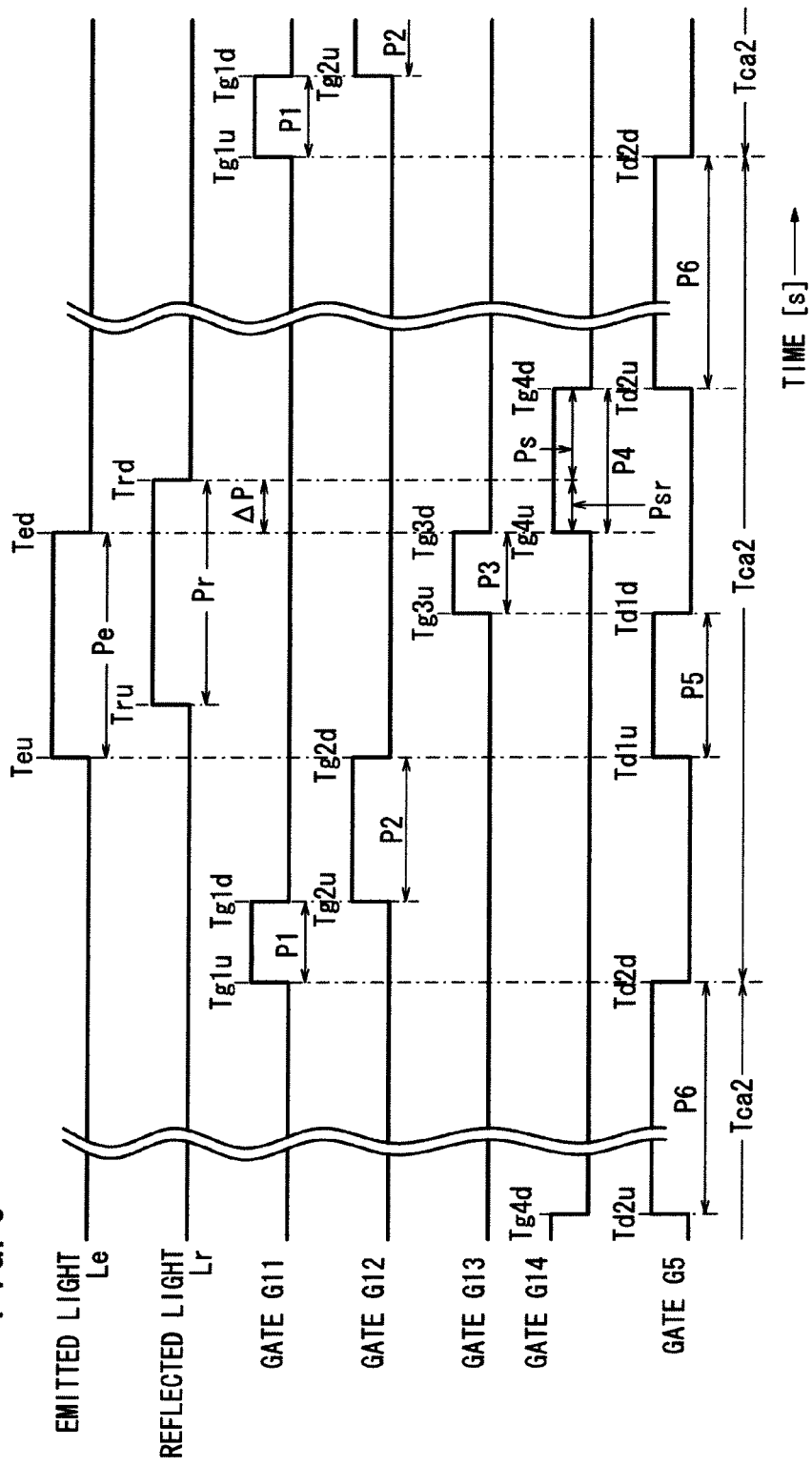
FIG. 6 is a timing chart of a photoelectron storage period within the measuring cycle.

FIG. 6 is a timing chart of the emitted light Le, the reflected light Lr, the gates G11 through G14 of the first switching elements 60a through 60d, and the gate G5 of the fourth switching element 70, during the photoelectron storage period Tca2.

According to the present embodiment, as shall be described in detail later, the rangefinding system 10 measures the distance D based on the fact that, if the reflected light Lr has a constant intensity Ir [W], then a period during which reflected light Lr is exposed to the photodetector 50 (a reflected light incident period Pri [s]) is proportional to the cumulative light energy of reflected light Lr during the reflected light incident period Pri (measured reflected light energy Amr [J]).

More specifically, the rangefinding system 10 determines cumulative light energy (ambient light reference energy Ars) [J] (equivalent to the photoelectron quantity Q1 of the capacitor 62a) during a period P1, as a first reference period during which only ambient light Ls is exposed to the photodetector 50. Further, the rangefinding system 10 determines cumulative light energy (combined light reference energy Ari) [J] (equivalent to the photoelectron quantity Q3 of the capacitor 62c) during a period P3 (=P1), as a second reference period during which both ambient light Ls and reflected light Lr are exposed to the photodetector 50. Additionally, the rangefinding system 10 determines cumulative light energy (measured ambient light energy Ams) [J] (equivalent to the photoelectron quantity Q2 of the capacitor 62b) during a period P2, as a first measurement period during which only ambient light Ls is exposed to the photodetector 50. Further, the rangefinding system 10 determines cumulative light energy (measured combined light energy Ami) [J] (equivalent to the photoelectron quantity Q4 of the capacitor 62*d*) during a period P4 (=P2), as a second measurement period during which both ambient light Ls and reflected light Lr are exposed to the photodetector 50. The period P4 comprises a period (period Psr [s]) during which both ambient light Ls and reflected light Lr are exposed, together with a period (period Ps [s]) during which only ambient light Ls is exposed. The period Psr is proportional to the distance D up to the object W.

A ratio of the difference between the combined light reference energy Ari and the ambient light reference energy Ars (reflected light reference energy Arr [J]) to the difference between the measured combined light energy Ami and the measured ambient light energy Ams (measured reflected light energy Amr [J]) (Ari−Ars:Ami−Ams) is equal to a ratio of the period P3 (=P1) to the reflected light incident period Pri (P3:Pri). Based on such equal ratios, the rangefinding system 10 determines a period (round trip time ΔP) during which pulsed light Lp emitted from the rangefinding system 10 impinges upon the object W and then travels back to the rangefinding system 10. Then, based on the round trip time ΔP, the rangefinding system 10 determines the distance D between the rangefinding system 10 and the object W.

(3) Details of the Measuring Process (One Photoelectron Storage Period Tca2):

(a) Explanation of Timing Chart:

In FIG. 6, time Teu represents a time at which emission of emitted light Le is started, whereas time Ted represents a time at which emission of the emitted light Le is stopped. The period Pe represents a period from time Teu to time Ted. Time Tru represents a time at which exposure of reflected light Lr to the photodetector 50 is started, whereas time Trd represents a time at which exposure of the reflected light Lr to the photodetector 50 is stopped. The period Pr represents a period from time Tru to time Trd.

Times Tg1*u*, Tg2*u*, Tg3*u*, and Tg4*u* represent times at which the gates G11 through G14 of the first switching elements 60*a* through 60*d* are opened, whereas times Tg1*d*, Tg2*d*, Tg3*d*, and Tg4*d* represent times at which the gates G11 through G14 are closed. The period P1 represents a period from time Tg1*u* to time Tg1*d*. The period P2 represents a period from time Tg2*u* to time Tg2*d*. The period P3 represents a period from time Tg3*u* to time Tg3*d*. The period P4 represents a period from time Tg4*u* to time Tg4*d*. The period Psr represents a period from time Tg4*u* to time Trd, and the period Ps represents a period from time Trd to time Tg4*d*.

Times Td1*u* and Td2*u* represent times at which the gate G5 of the fourth switching element 70 is opened, whereas times Td1*d* and Td2*d* represent times at which the gate G5 is closed. The period P5 represents a period from time Td1*u* to time Td1*d*. The period P6 represents a period from time Td2*u* to time Td2*d*.

The period Pr, during which reflected light Lr is exposed to the photodetector 50, is equal to the period Pe (Pe=Pr), although there is a delay from time Teu to time Tru or from time Ted to time Trd (round trip time ΔP). The period Pr may be set to a value in a range from 10 nanoseconds to 1 microsecond. In the present embodiment, the period Pr is 100 nanoseconds. In the control device 16, the period P1 and the period P3 are set equal to each other, and the period P2 and the period P4 also are set equal to each other (P1=P3, P2=P4). The periods P1 and P3 can be set to values in a range from 10 nanoseconds to 90 nanoseconds, for example. In the present embodiment, the periods P1 and P3 are 30 nanoseconds. The period P2 can be set to a value in a range from 10 nanoseconds to 90 nanoseconds, for example. In the present embodiment, the period P2 is 70 nanoseconds. The period P5 can be set to a value in a range from 0 seconds to 90 nanoseconds, for example. In the present embodiment, the period P5 is 70 nanoseconds. The period P6 can be set to a value in a range from 10 microseconds to 1 millisecond. In the present embodiment, the period P6 is about 100 microseconds. Therefore, among the periods P1 through P6, the period P6 is considerably long.

As can be seen from FIG. 6, during the photoelectron storage period Tca2 [s] of the rangefinding system 10, the gate G11 is opened for the period P1, and simultaneously with closing of the gate G11, the gate g12 is opened and remains open for the period P2. Simultaneously with closing of the gate G12, emitted light Le is emitted toward the object W, and the gate G5 remains open for the period P5. While emitted light Le is output during the period Pe, reflected light Lr starts to be exposed to the photodetector 50 at time Tru. After elapse of the period Pe from start of emission of the emitted light Le at time Teu, the gate G5 is closed and the gate G13 is opened. The gate G13 remains open for the period P3. After elapse of the period Pe, emission of the emitted light L3 is stopped, the gate G13 is closed, and the gate G14 is opened, whereupon the gate G14 remains open for the period P4. While the gate G14 is open during the period P4, reflected light Lr stops being exposed to the photodetector 50 at time Trd. Stated otherwise, the period P4 determines the measurement range [m] (range of distances that can be measured) of the rangefinding system 10. Simultaneously with closing of the gate G14, the gate G5 is opened and remains open for the period P6. After elapse of the period P6, the gate G5 is closed, whereupon one photoelectron storage period Tca2 is completed at time Td2*d*. At the same time, a subsequent photoelectron storage period Tca2 is initiated, whereupon the gate G11 is opened at time Tg1*u*. The control device 16 controls the respective components of the light-emitting device 12 and the light-detecting device 14. Preferably, the control device 16 is fabricated by a CMOS process on the same silicon substrate as the light detector 22.

(b) Explanation of Measurement Principles:

(i) Calculation of Reflected Light Reference Energy Arr:

If the rangefinding system 10 and the object W are fixed in respective positions, then reflective light Lr, which is reflected by the object W and returned to the rangefinding system 10, can be regarded as having a constant intensity (light energy per unit time). Since the period P1 is set to a period during which only ambient light Ls is exposed to the photodetector 50, the capacitor 62*a* of the first photoelectron storage unit 52*a* stores photoelectrons that are generated only due to ambient light Ls. Since the period P3 is set to a period during which both ambient light Ls and reflected light Lr are exposed to the photodetector 50, the capacitor 62*c* of the third photoelectron storage unit 52*c* stores photoelectrons that are generated due to both ambient light Ls and reflected light Lr. The lengths of the period P1 and the period P3 are the same.

Therefore, the difference between the photoelectron quantity Q3 stored in the capacitor 62*c* and the photoelectron quantity Q1 stored in the capacitor 62*a* is representative of the cumulative energy (reflected light reference energy Arr) of reflected light Lr during the period P3 (=period P1).

(ii) Calculation of Measured Reflected Light Energy Amr and Round Trip Time ΔP:

If the rangefinding system 10 and the object W are located in respective fixed positions, then reflective light Lr, which is reflected by the object W and returned to the rangefinding system 10, can be regarded as having a constant intensity. Since the period P1 is set to a period during which only ambient light Ls is exposed to the photodetector 50, the capacitor 62b of the second photoelectron storage unit 52b stores photoelectrons that are generated only from ambient light Ls. Since the period P4 is set to a period including both a period (period Psr) during which ambient light Ls and reflected light Lr are exposed to the photodetector 50, together with a period (Ps) during which only ambient light Ls is exposed to the photodetector 50, the capacitor 62d of the fourth photoelectron storage unit 52d stores photoelectrons generated both from ambient light Ls and from reflected light Lr. The lengths of the period P2 and the period P4 are the same.

Therefore, the difference between the photoelectron quantity Q4 stored in the capacitor 62d and the photoelectron quantity Q2 stored in the capacitor 62b represents cumulative energy (measured reflected light energy Amr) of reflected light Lr during the period P3 (=period P2). In the present embodiment, the period P4 starts at time Ted, at which emission of the emitted light Le is stopped. Consequently, during the period P4, reflected light Lr corresponding to the pulse round trip time $\Delta P$ is exposed to the photodetector 50, whereupon photoelectrons are stored in the capacitor 62d. Therefore, the photoelectron quantity Q4 stored in the capacitor 62d corresponds to the sum of the cumulative energy (measured ambient light energy Ams) of ambient light Ls during the entire period P4, together with the cumulative energy (measured reflected light energy Amr) of reflected light Lr during the round trip time $\Delta P$. Thus, the difference between the photoelectron quantity Q4 and the photoelectron quantity Q2 represents a photoelectron quantity that corresponds to the measured reflected light energy Amr. The round trip time $\Delta P$ depends on the distance D between the rangefinding system 10 and the object W. Accordingly, a ratio of the measured reflected light energy Amr (corresponding to the difference between the photoelectron quantity Q4 and the photoelectron quantity Q2) to the reflected light reference energy Arr (corresponding to the difference between the photoelectron quantity Q3 and the photoelectron quantity Q1) is equal to a ratio of the round trip time $\Delta P$ to the period P3 (=period P1) (Amr:Arr=Q4−Q2:Q3−Q1=$\Delta P$:P3). The round trip time $\Delta P$ can therefore be calculated by the following equation (1):

$$\Delta P = \{(Q4-Q2)/(Q3-Q1)\} \times P3 \quad (1)$$

(iii) Calculation of Distance D:

Once the round trip time $\Delta P$ is known, the distance D between the rangefinding system 10 and the object W can be calculated by equation (2) below. In equation (2), c represents a constant indicative of the velocity of light (about 300,000 kilometers per second). The product $c \times \Delta P$ is divided by 2 due to the fact that the pulsed light Lp reciprocates between the rangefinding system 10 and the object W, and hence travels a distance that is twice the distance D.

$$D = c \times \Delta P / 2 \quad (2)$$

(iv) Others:

The pixel 32 is initialized (reset) by the following process. In response to the resetting signals Sreset1 through Sreset4 being applied to the gates G41 through G44 (i.e., in response to high-level voltages being applied to the gates G41 through G44), the third switching elements 68a through 68d are turned on simultaneously. Further, simultaneously therewith, in response to the photoelectron discharge signal Sde being applied to the gate G5 (i.e., in response to a high-level voltage applied to the gate G5), the fourth switching element 70 is turned on. At this time, the gate drive signals Sdg1 through Sdg4 are not applied to the gates G11 through G14 (i.e., low-level voltages are applied to the gates G11 through G14), so that the first switching elements 60a through 60d remain turned off. The capacitors 62a through 62d are thus set to the reference voltage Vref. Thereafter, the resetting signals Sreset1 through Sreset4 stop being applied to the gates G41 through G44 (i.e., low-level voltages are applied to the gates G41 through G44), thereby setting the capacitors 62a through 62d to the reference voltage Vref. Subsequently, the measuring process shown in FIG. 6 is performed.

(4) Details of the Measuring Process (Cumulative Photoelectron Storage Period Tca1).

In items (2) and (3) described above, a measuring process has been described for one photoelectron storage period Tca2. According to the present embodiment, the rangefinding system 10 calculates the round trip time $\Delta P$ in the same manner described above, using the photoelectron quantities Q1 through Q4 (hereinafter referred to as "photoelectron quantities Q1a through Q4a"), which are stored in the capacitors 62a through 62d during 100 photoelectron storage periods Tca2 (cumulative photoelectron storage period Tca1).

The photoelectron quantity Q1a represents the sum of the photoelectron quantities Q1 that are stored in the capacitor 62a during the first through 100th photoelectron storage periods Tca2. Similarly, the photoelectron quantities Q2a through Q4a represent the sums of the photoelectron quantities Q2 through Q4, which are stored in the capacitors 62b, 62c, 62d during the first through 100th photoelectron storage periods Tca2:

(5) Others:

According to the present embodiment, the rangefinding system 10 measures the distance D using the photoelectron quantities Q1 through Q4 (photoelectron information) stored in each of the pixels 32. The rangefinding system 10 can obtain a three-dimensional image by combining the distance information from the pixels 32.

3. Advantages of the Present Embodiment

According to the present embodiment, the rangefinding system 10 exhibits an increased dynamic range and is capable of reducing or eliminating the effect of ambient light Ls. As a consequence, the measurement accuracy of the rangefinding system 10 is increased.

More specifically, according to the present embodiment, the rangefinding system 10 determines the photoelectron quantity Q1 stored during the period P1, in which only ambient light Ls is exposed to the photodetector 50, and the photoelectron quantity Q3 stored during the period P3, during which both ambient light Ls and reflected light Lr are exposed to the photodetector 50. Since the period P1 and the period P3 are set to the same length, the rangefinding system 10 is capable of determining a photoelectron quantity corresponding to the reflected light Lr during the period P3 (i.e., corresponding to the reference energy Arr of the reflected light Lr during the period P3) from the difference between the photoelectron quantity Q3 and the photoelectron quantity Q1 (Q3−Q1).

The rangefinding system 10 also determines the photoelectron quantity Q2 stored during the period P2, in which only ambient light Ls is exposed to the photodetector 50, and the photoelectron quantity Q4 stored during the period P4. Period P4 comprises a period (period Psr) during which both ambient light Ls and reflected light Lr are exposed to the photodetector 50, as well as a period (period Ps) during which only ambient light Ls is exposed to the photodetector 50. Since the period P2 and the period P4 are set to the same length, the rangefinding system 10 can determine the photoelectron quantity corresponding to the period Psr that occurs within the period P4 (corresponding to the energy of reflected light Lr in the period Psr) from the difference between the photoelectron quantity Q4 and the photoelectron quantity Q2 (Q4−Q2).

If the intensity Ir of reflected light Lr is constant while the reflected light Lr is exposed to the photodetector 50, then a ratio of the difference between the photoelectron quantity Q4 and the photoelectron quantity Q2 to the difference between the photoelectron quantity Q3 and the photoelectron quantity Q1 (Q4−Q2:Q3−Q1) becomes equal to a ratio of the period Psr to the period P3 (Psr:P3). Therefore, the period Psr can be determined by the following equation (3):

$$Psr=\{(Q4-Q2)/(Q3-Q1)\}\times P3 \qquad (3)$$

Since time Ted and time Tg$4u$ are equal to each other, the period Psr is equal to the round trip time ΔP. Therefore, the period Psr can be determined by the above equation (3), and hence, the distance D can be determined based on the round trip time ΔP and the velocity of light.

Since the rangefinding system 10 removes the photoelectron quantity Q2, which is generated by the ambient light Ls, the rangefinding system 10 is capable of eliminating or reducing the effect of ambient light Ls.

As the distance D becomes smaller, the period during which reflected light Lr is exposed (i.e., the period Psr) is made shorter, whereas, as the distance D becomes greater, the period Psr is made longer. Generally, assuming the same object W is involved, as the distance D becomes smaller, the intensity Ir of the reflected light Lr reflected from the object becomes greater, whereas, as the distance D becomes greater, the intensity Ir of the reflected light Lr reflected from the object becomes smaller. Consequently, if the distance D is comparatively small, then reflected light Lr of a greater intensity Ir is exposed over a shorter period. On the other hand, if the distance D is comparatively great, then reflected light Lr of a smaller intensity Ir is exposed over a longer period. As a result, a change in the energy Ar of reflected light Lr, which is exposed during the period Psr, is small compared with the change in the distance D. This implies that it is possible to narrow the dynamic range of the light-detecting device 14, and therefore, the dynamic range of the rangefinding system 10 can be increased.

According to the present embodiment, pulsed light Lp is emitted 100 times during each measuring cycle Cm, and the round trip time ΔP is calculated using the photoelectron quantities Q1 through Q4, which are stored 100 times in the capacitors 62a through 62d. Generally, the intensity of ambient light Ls (e.g., sunlight) varies at all times. By emitting the pulsed light Lp 100 times during each measuring cycle Cm, and calculating the round trip time ΔP using the photoelectron quantities Q1 through Q4, which are stored as many times as the number of times that the pulsed light Lp is emitted, the intensity of the ambient light Ls can be averaged. As a consequence, the accuracy at which the photoelectron quantity generated by ambient light Ls is removed can be increased, thereby increasing measurement accuracy.

According to the present embodiment, the pulsed light Lp has a pulse duration (output period) of 10 microseconds (=100 nanoseconds×100), which is 0.05 percent of each measuring cycle Cm (20 milliseconds). Commensurate with such a pulse duration, the periods P1 through P4 during which the gates G11 through G14 are opened also are shortened. Therefore, even if another rangefinding system, which uses pulsed light having the same frequency, is present in the vicinity of the rangefinding system 10, the possibility that the timing at which the other rangefinding system outputs pulsed light and the timing at which the rangefinding system 10 outputs pulsed light Lp will overlap with each other is low. As a result, the possibility of interference with the other rangefinding system (i.e., that pulsed light from the other rangefinding system will be falsely recognized as constituting pulsed light Lp from the rangefinding system 10) is low.

In addition, since the periods P1 through P4, during which times the gates G11 through G14 are opened, also are shortened, the lengths of time during which ambient light Ls is exposed to the photodetector 50 within the periods P1 through P4 are shortened. Thus, the effect that ambient light Ls has as a noise component is reduced, thereby increasing the signal-to-noise ratio (S/N). More particularly, if such ambient light Ls is sunlight, then shot noise caused by the sunlight is reduced.

According to the present embodiment, since the periods P1 through P4, during which the gates G11 through G14 are opened, are very short compared with the measuring cycle Cm, the possibility of a phenomenon (i.e., aliasing) in which pulsed light Lp emitted in a previous measuring cycle Cm is detected in the current measuring cycle Cm can be reduced. More specifically, according to the present embodiment, inasmuch as each photoelectron storage period Tca2 is 100 microseconds, and the period Pe during which pulsed light Lp is emitted is short, such pulsed light Lp is emitted at intervals of about 100 microseconds. Since the velocity c of light is about 300,000 kilometers per second, a possibility for aliasing to occur exists only if the actual position of the object W is 15 kilometers (=100 [μs]×30 [Mm/s]/2) farther than the distance D output by the rangefinding system 10. However, because the intensity of pulsed light Lp, which is exposed to the object W by the light emitter 18, is reduced in proportion to the square of the distance D, the intensity Ir of reflected light Lr from a position that is 15 kilometers farther than the distance D is very small compared to the intensity Ir of reflected light Lr from the object W at the distance D, thus making it almost impossible for the photodetector 50 to detect the reflected light Lr. Accordingly, the rangefinding system 10 according to the present embodiment can prevent aliasing from occurring.

B. Modifications

The present invention is not limited to the above embodiment, but various modified arrangements may be adopted based on the details of the above description. For example, the present invention may adopt the following arrangements described below.

In the above embodiment, the gates G11 through G14 are controlled according to the timing chart shown in FIG. 6. However, the present invention is not limited to the timing chart shown in FIG. 6. For example, the periods P3, P4 in FIG. 6 may be positioned ahead of the periods P1, P2. Furthermore, although time Tg$1d$ and time Tg$2u$ occur simultaneously in FIG. 6, time Tg$2u$ may occur subsequently to time Tg$1d$. The relationship between time Tg$2d$ and time Teu, as well as the relationship between time Tg$3d$ and time Tg$4u$, may be changed in a similar manner. Moreover, time Tg$4u$ may occur non-simultaneously with time Ted, if the correlation thereof with time Ted is known.

Figure 7:
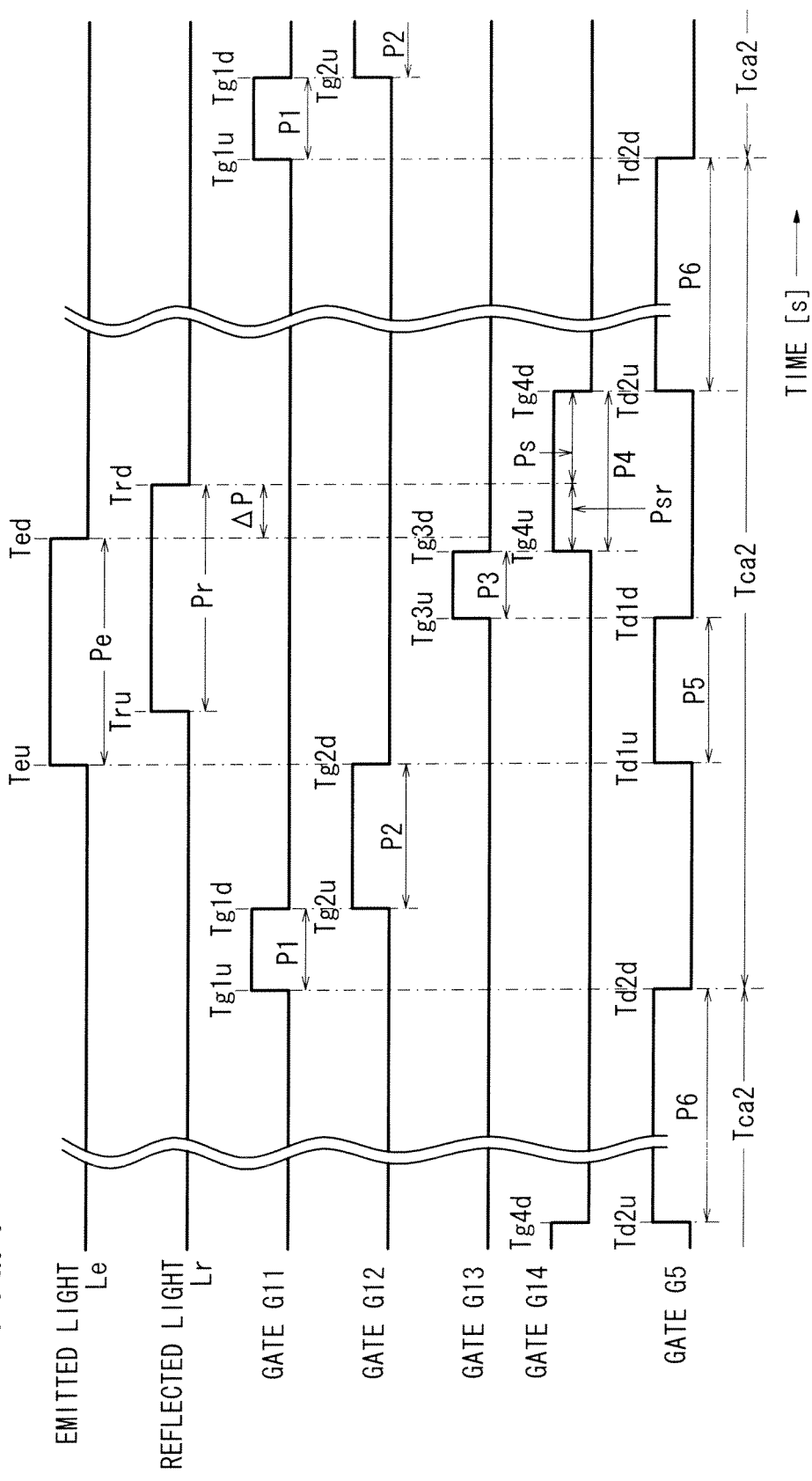
FIG. 7 is a timing chart, which is a modification of the timing chart shown in FIG. 6.

FIG. 7 is a timing chart in which time Ted occurs subsequently to time Tg$4u$. In this case, the round trip time ΔP is calculated by the following equation (4):

$$\Delta P = [(Q4-Q2)/(Q3-Q1)]\times P3 - (Ted-Tg4u) \qquad (4)$$

Alternatively, time Ted may occur in advance of time Tg$4u$. In this case, the round trip time ΔP is calculated by the following equation (5):

$$\Delta P = [(Q4-Q2)/(Q3-Q1)]\times P3 + (Tg4u-Ted) \qquad (5)$$

In the above embodiment, the periods P1 and P2 are provided in order to eliminate or reduce the effect of ambient light Ls. However, if there is no ambient light Ls, for example in a dark room or the like, or if the ambient light Ls is small compared with the reflected light Lr and thus has little effect, then the round trip time ΔP can be determined only from the periods P3 and P4. More specifically, the round trip time ΔP is calculated by the following equation (6):

$$\Delta P = (Q4/Q3) \times P3 \quad (6)$$

In the above embodiment, the photodetector 50 comprises a pinned photodiode (FIG. 4). Alternatively, the photodetector 50 may comprise another type of photodetector, such as a photodiode, a photogate, or the like, rather than the pinned photodiode.

FIG. 8 is a partial vertical cross-sectional view of a pixel 32a, which incorporates therein a photogate, which serves as a photodetector. As shown in FIG. 8, the pixel 32a comprises a P-type substrate 100, a photogate 102, an N-type semiconductor region 104, a transfer gate 106 in the form of a polysilicon layer, and a light shield 108.

In the pixel 32a, the photogate 102 makes up a photodetector 50a. The substrate 100, the photogate 102, the semiconductor region 104, and the transfer gate 106 jointly make up a first switching element 60a1. The semiconductor region 104 also functions as a floating diffusion, and constitutes a capacitor 62a1. The pixel 32a includes first switching elements 60b1 through 60d1, which are identical in structure to the first switching element 60a1, and capacitors 62b1 through 62d1, which are identical in structure to the capacitor 62a1.

The light shield 108 is disposed in covering relation to the semiconductor region 104 and the transfer gate 106, for thereby blocking the reflected light Lr and the ambient light Ls from entering into the semiconductor region 104 and the transfer gate 106.

FIG. 9 is a timing chart of the emitted light Le, the reflected light Lr, the gates G11 through G14 of the first switching elements 60a1 through 60d1, the gate G5 of the fourth switching element 70, and the photogate 102, for measuring the distance D using the pixel 32a.

The timing chart shown in FIG. 9 is the same as the timing chart shown in FIG. 6, except for the timing of the photogate 102. In FIG. 9, the photogate 102 is opened at times Tp1u through Tp6u, while the photogate 102 is closed at times Tp1d through Tp6d within the periods P1 through P6. The photogate 102 is closed by a period Pp earlier than the times Tg1d through Tg4d, Td1d, and Td2d, at which the periods P1 through P6 terminate. Therefore, photoelectrons, which are photoelectrically generated by the photogate 102, can quickly be transferred to the semiconductor region 104 without remaining inside the photogate 102.

The invention claimed is:

1. A rangefinding system comprising:
a light-emitting device for emitting pulsed light toward an object;
a light-detecting device for detecting reflected light from the pulsed light, and producing an output signal depending on the energy of reflected light that is detected;
a control device for controlling the light-emitting device and the light-detecting device; and
an arithmetic device for calculating a distance up to the object according to a time-of-flight process using the output signal from the light-detecting device;
the light-detecting device further comprising:
a photodetector for detecting the reflected light and generating photoelectrons by the detected reflected light;
first through fourth capacitors for storing the photoelectrons from the photodetector;
a photoelectron discharger for discharging the photoelectrons from the photodetector;
first through fourth gate electrodes disposed between the photodetector and the first through fourth capacitors, for allotting the photoelectrons with respect to the first through fourth capacitors in synchronism with emission of the pulsed light; and
a fifth gate electrode disposed between the photodetector and the photoelectron discharger, for controlling supply of the photoelectrons from the photodetector and the photoelectron discharger;
wherein, if it is assumed that a time at which the pulsed light starts to be emitted is referred to as time Teu,
a time at which the pulsed light stops being emitted is referred to as time Ted,
a time at which the reflected light stops being exposed to the photodetector is referred to as time Trd,
respective times at which the first through fourth gate electrodes are opened are referred to as times Tg1u, Tg2u, Tg3u, and Tg4u,
respective times at which the first through fourth gate electrodes are closed are referred to as times Tg1d, Tg2d, Tg3d, and Tg4d,
a period from the time Tg1u to the time Tg1d is referred to as period P1,
a period from the time Tg2u to the time Tg2d is referred to as period P2,
a period from the time Tg3u to the time Tg3d is referred to as period P3,
a period from the time Tg4u to the time Tg4d is referred to as period P4,
a period from the time Tg4d to the time Trd is referred to as period Psr,
a photoelectron quantity stored in the first capacitor during the period P1 is referred to as photoelectron quantity Q1,
a photoelectron quantity stored in the second capacitor during the period P2 is referred to as photoelectron quantity Q2,
a photoelectron quantity stored in the third capacitor during the period P3 is referred to as photoelectron quantity Q3,
a photoelectron quantity stored in the fourth capacitor during the period P4 is referred to as photoelectron quantity Q4,
a period during which the pulsed light is emitted, reflected by the object, and returned as the reflected light is referred to as round trip time ΔP, and
a distance between the rangefinding system and the object is referred to as distance D,
then the control device controls emission of the pulsed light from the light-emitting device and opening and closing of the first through fourth gate electrodes so as to satisfy the following relationships:
(1) P1=P3;
(2) P2=P4; and
(3) $Tg1u < Tg1d \leq Tg2u < Tg2d \leq Teu < Tg3u < Tg3d \leq Tg4u \leq Ted < Tg4d$, or $Teu < Tg3u < Tg3d \leq Tg4u \leq Ted < Tg4d < Tg1u < Tg1d \leq Tg2u < Tg2d$; and
the control device opens the fifth gate electrode to discharge the photoelectrons when all of the first through fourth gate electrodes are closed;
the arithmetic device acquires light energy information of the reflected light during the period P3 based on the difference between the photoelectron quantity Q3 stored in the third capacitor corresponding to ambient light and the reflected light, and the photoelectron quantity Q1 stored in the first capacitor corresponding to the ambient light;

the arithmetic device acquires light energy information of the reflected light during the period Psr based on the difference between the photoelectron quantity Q4 stored in the fourth capacitor corresponding to the ambient light and the reflected light, and the photoelectron quantity Q2 stored in the second capacitor corresponding to the ambient light;

the arithmetic device calculates the round trip time ΔP based on a ratio of the light energy information of the reflected light during the period P3 and the light energy information of the reflected light during the period Psr, and a ratio of the period P3 and the period Psr; and the arithmetic device measures the distance D based on the round trip time ΔP.

2. The rangefinding system according to claim 1, wherein when the time Ted and the time Tg4u are equal to each other, the arithmetic device calculates the round trip time ΔP according to the following equation (1):

$$\Delta P = \{(Q4-Q2)/(Q3-Q1)\} \times P3 \qquad (1)$$

and when the time Ted is subsequent to the time Tg4u, the arithmetic device calculates the round trip time ΔP according to the following equation (2):

$$\Delta P = [(Q4-Q2)/(Q3-Q1)] \times P3 - (Ted - Tg4u) \qquad (2)$$

3. The rangefinding system according to claim 1, wherein the control device controls the light-emitting device so as to emit the pulsed light a plurality of times during each measuring cycle; and the arithmetic device calculates the round trip time ΔP using the photoelectron quantities Q1 through Q4, after the photoelectrons have been stored a plurality of times in each of the first through fourth capacitors.

4. The rangefinding system according to claim 1, wherein the light-emitting device sets a period during which the pulsed light is emitted to at most 1 percent of each measuring cycle; and the light-detecting device sets a period during which the first through fourth gate electrodes are opened to at most 1 percent of each measuring cycle.

5. The rangefinding system according to claim 1, wherein the light-detecting device further comprises first through fourth amplifiers having respective gates connected respectively to the first through fourth capacitors, for outputting voltages depending on potentials across the first through fourth capacitors.

6. The rangefinding system according to claim 1, wherein the light-detecting device further comprises a power supply and sixth gate electrodes for resetting potentials across the first through fourth capacitors.

7. The rangefinding system according to claim 1, wherein the photodetector comprises one of a photodiode, a pinned photodiode, and a photogate.

8. The rangefinding system according to claim 1, wherein each of the first through fourth capacitors comprises one of an MIM capacitor, a MOS capacitor, a pinned photodiode, and a PN junction.

9. The rangefinding system according to claim 1, wherein the light-detecting device further comprises a light shield for blocking light from entering into the first through fourth gate electrodes and the first through fourth capacitors.

10. The rangefinding system according to claim 1, wherein the light-emitting device includes a light emitter comprising one of a light-emitting diode, a laser diode, and a semiconductor laser bar.

11. The rangefinding system according to claim 1, wherein the light-emitting device includes a light emitter comprising an array of semiconductor laser bars.

12. The rangefinding system according to claim 1, wherein the light-detecting device includes one of a line sensor and an image sensor having a plurality of pixels each comprising the photodetector, the first through fourth capacitors, the photoelectron discharger, and the first through fifth gate electrodes.

13. A rangefinding method carried out by a rangefinding system including a light-emitting device for emitting pulsed light toward an object, a light-detecting device for detecting reflected light from the pulsed light and producing an output signal depending on the energy of reflected light that is detected, a control device for controlling the light-emitting device and the light-detecting device, and an arithmetic device for calculating a distance up to the object according to a time-of-flight process using the output signal from the light-detecting device, the rangefinding method comprising the steps of:

determining reflected light reference energy, which represents cumulative light energy of the reflected light during a reference period;

determining measured reflected light energy, which represents cumulative light energy of the reflected light during a measuring cycle;

calculating a reflected light incident period, which represents a period during which the reflected light is exposed to a photodetector of the light-detecting device within the measuring cycle, based on a ratio of the measured reflected light energy and the reflected light reference energy, and a ratio of the reflected light incident period and the reference period; and calculating a distance between the rangefinding system and the object based on the reflected light incident period.

14. The rangefinding method according to claim 13, wherein the step of determining the reflected light reference energy further comprises the steps of:

determining ambient light reference energy, which represents cumulative light energy of ambient light during a first reference period;

determining combined light reference energy, which represents cumulative combined light energy of the ambient light and the reflected light during a second reference period, which has the same length as the first reference period; and calculating the reflected light reference energy during the second reference period by subtracting the ambient light reference energy from the combined light reference energy; and wherein the step of determining the measured reflected light energy further comprises the steps of:

determining measured ambient light energy, which represents cumulative light energy of the ambient light during a first measuring cycle;

determining measured combined light energy, which represents cumulative combined light energy of the ambient light and the reflected light during a second measuring cycle, which has the same length as the first measuring cycle; and calculating the measured reflected light energy during the second reference period by subtracting the measured ambient light energy from the measured combined light energy.

15. The rangefinding method according to claim 14, further comprising the steps of:
- setting a plurality of first reference periods, a plurality of second reference periods, a plurality of first measuring cycles, and a plurality of second measuring cycles in each measuring cycle;
- determining the ambient light reference energy as a sum of cumulative light energy of the ambient light respectively during the first reference periods;
- determining the combined light reference energy as a sum of cumulative combined light energy respectively during the second reference periods;
- determining the measured ambient light energy as a sum of cumulative light energy of the ambient light respectively during the first measuring cycles; and
- determining the measured combined light energy as a sum of cumulative combined light energy respectively during the second measuring cycles.

16. The rangefinding method according to claim 13, wherein each of a period during which the pulsed light is emitted, the reference period, and the measuring period is set to at most 1 percent of each measuring cycle.

* * * * *